(12) United States Patent
Ilhan et al.

(10) Patent No.: US 11,178,432 B2
(45) Date of Patent: Nov. 16, 2021

(54) MULTI-USE FOG DEVICE

(71) Applicant: INTEL CORPORATION, Santa Clara, CA (US)

(72) Inventors: Zana Ilhan, Shannon (IE); Jose A. Avalos, Chandler, AZ (US); Rajnish Maini, Chandler, AZ (US); Eric R. Auzas, Scottsdale, AZ (US); Zafer Kadi, Tempe, AZ (US); Addicam V. Sanjay, Gilbert, AZ (US)

(73) Assignee: Intel Corporation, Santa Clara, CA (US)

(*) Notice: Subject to any disclaimer, the term of this patent is extended or adjusted under 35 U.S.C. 154(b) by 81 days.

(21) Appl. No.: 16/347,758

(22) PCT Filed: Nov. 17, 2016

(86) PCT No.: PCT/US2016/062604
§ 371 (c)(1),
(2) Date: May 6, 2019

(87) PCT Pub. No.: WO2018/093371
PCT Pub. Date: May 24, 2018

(65) Prior Publication Data
US 2019/0320210 A1 Oct. 17, 2019

(51) Int. Cl.
*H04N 21/214* (2011.01)
*G06F 3/14* (2006.01)
(Continued)

(52) U.S. Cl.
CPC ....... *H04N 21/2143* (2013.01); *G06F 3/1446* (2013.01); *G06F 13/4282* (2013.01);
(Continued)

(58) Field of Classification Search
CPC ....... H04N 21/2143; H04N 21/234309; H04N 21/43632; G06F 3/1446; G06F 13/4282;
(Continued)

(56) References Cited

U.S. PATENT DOCUMENTS

2007/0153121 A1* 7/2007 Pertierra ................ H04N 9/045
348/375
2008/0055464 A1* 3/2008 Shin ..................... H04N 21/426
348/441
(Continued)

FOREIGN PATENT DOCUMENTS

WO 2014092551 A1 6/2014

OTHER PUBLICATIONS

International Search Report for related PCT application serial No. PCT/US2016/062604 with a filing date of Nov. 17, 2016 and dated Aug. 1, 2017, 4 pages.
(Continued)

*Primary Examiner* — Nathan J Flynn
*Assistant Examiner* — Caroline Somera
(74) *Attorney, Agent, or Firm* — Schwegman Lundberg & Woessner, P.A.

(57) ABSTRACT

Systems and methods for displaying content from a multi-use fog device are provided. The multi-use fog device may include a processor to execute code segments, and a floating-point gate array (FPGA) card that is coupled to the processor through a PCIe interface. The FPGA card includes a header for connecting sensors to the multi-use fog device, and an FPGA that provides video processing for the multi-use fog device.

22 Claims, 10 Drawing Sheets

(51) Int. Cl.
*G06F 13/42* (2006.01)
*G06F 21/57* (2013.01)
*H04N 21/2343* (2011.01)
*H04N 21/4363* (2011.01)

(52) U.S. Cl.
CPC ... *G06F 21/575* (2013.01); *H04N 21/234309* (2013.01); *H04N 21/43632* (2013.01); *G06F 2213/0026* (2013.01); *G06F 2221/034* (2013.01)

(58) Field of Classification Search
CPC .......... G06F 21/575; G06F 2213/0026; G06F 2221/034
USPC .......................................................... 725/82
See application file for complete search history.

(56) References Cited

U.S. PATENT DOCUMENTS

| | | | | |
|---|---|---|---|---|
| 2008/0309646 | A1* | 12/2008 | Liu | G06F 3/041 345/179 |
| 2013/0281058 | A1 | 10/2013 | Obaidi et al. | |
| 2014/0139548 | A1* | 5/2014 | Byers | G06Q 30/0281 345/619 |
| 2014/0327630 | A1* | 11/2014 | Burr | G06F 3/0416 345/173 |
| 2017/0188074 | A1* | 6/2017 | Mallett | H04N 21/4122 |
| 2018/0278462 | A1* | 9/2018 | Bjontegard | A63F 13/79 |

OTHER PUBLICATIONS

Consortium Openfog, "OpenFog Architecture Overview"; OpenFog Consortium Architecture Working Group, Feb. 28, 2016, retrieved from the Internet on Apr. 19, 2019: URL: https://www.openfogconsortium.org/wp-content/uploads/OpenFog_Reference_Architecture_2_09_17-FINAL.pdf , 162 pages.

Intel: 100 Series and Intel C230 Series Family Platform Controller Hub (PCH) May 31, 2016, retrieved from the Internet on Apr. 19, 2019, URL:https://www.intel.com/content/dam/www/public/us/en/documents/specification-updates/100-series-chipset-spec-update.pdf, 22 pages.

* cited by examiner

100

500

MULTI-USE FOG DEVICE

CROSS REFERENCE TO RELATED APPLICATIONS

Pursuant to 35 U.S.C. § 371, this application is the U.S. National Stage Application of International Patent Application No. PCT/US2016/062604, filed on Nov. 17, 2016, the contents of which are incorporated by reference as if set forth in their entirety herein.

TECHNICAL FIELD

The present techniques relate generally to Internet of Things (IoT) devices. More specifically the present techniques relate to devices that can perform remote sensing and video functions.

BACKGROUND

A current view of the Internet is the connection of clients, such as personal computers, tablets, smart phones, servers, digital photo-frames, and many other types of devices, to publicly-accessible data-centers hosted in server farms. However, this view represents a small portion of the overall usage of the globally-connected network. A very large number of connected resources currently exist, but are not publicly accessible. Examples include corporate networks, private organizational control networks, and monitoring networks spanning the globe, often using peer-to-peer relays for anonymity.

It has been estimated that the internet of things (IoT) may bring Internet connectivity to more than 15 billion devices by 2020. For organizations, IoT devices may provide opportunities for monitoring, tracking, or controlling other devices and items, including further IoT devices, other home and industrial devices, items in manufacturing and food production chains, and the like. The emergence of IoT networks has served as a catalyst for profound change in the evolution of the Internet. In the future, the Internet is likely to evolve from a primarily human-oriented utility to an infrastructure where humans may eventually be minority actors in an interconnected world of devices.

In this view, the Internet will become a communications system for devices, and networks of devices, to not only communicate with data centers, but with each other. The devices may form functional networks, or virtual devices, to perform functions, which may dissolve once the function is performed. Challenges exist in enabling reliable, secure, and identifiable devices that can form networks as needed to accomplish tasks.

One area in which IoT devices may provide advantages is in media devices. In these applications, active displays may be able to work together in a fog device to perform video functions.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

The internet of things (IoT) is a concept in which a large number of computing devices are interconnected to each other and to the Internet to provide functionality, such as data acquisition and actuation, at very low levels. As used herein, an IoT device may include a semiautonomous device performing a function, such as sensing or control, among others, in communication with other IoT devices and a wider network, such as the Internet. Often, IoT devices are limited in memory, size, or functionality, allowing larger numbers to be deployed for a similar cost to smaller numbers of larger devices. However, an IoT device may be a display panel and associated media device, a smart phone, a laptop, a tablet, or a personal computer, among others. Further, an IoT device may be a virtual device, such as an application on a smart phone or other computing device. IoT devices may include IoT gateways, used to couple IoT devices to other IoT devices and to cloud applications, for data storage, process control, and the like.

Networks of IoT devices may include communication devices, such as advertising displays, information kiosks, and video walls, as well as commercial and home automation devices, water distribution systems, electric power distribution systems, pipeline control systems, plant control systems, light switches, thermostats, locks, cameras, alarms, motion sensors, and the like. The IoT devices may be accessible through remote computers, servers, and other systems, for example, to control systems or access data.

Figure 1:
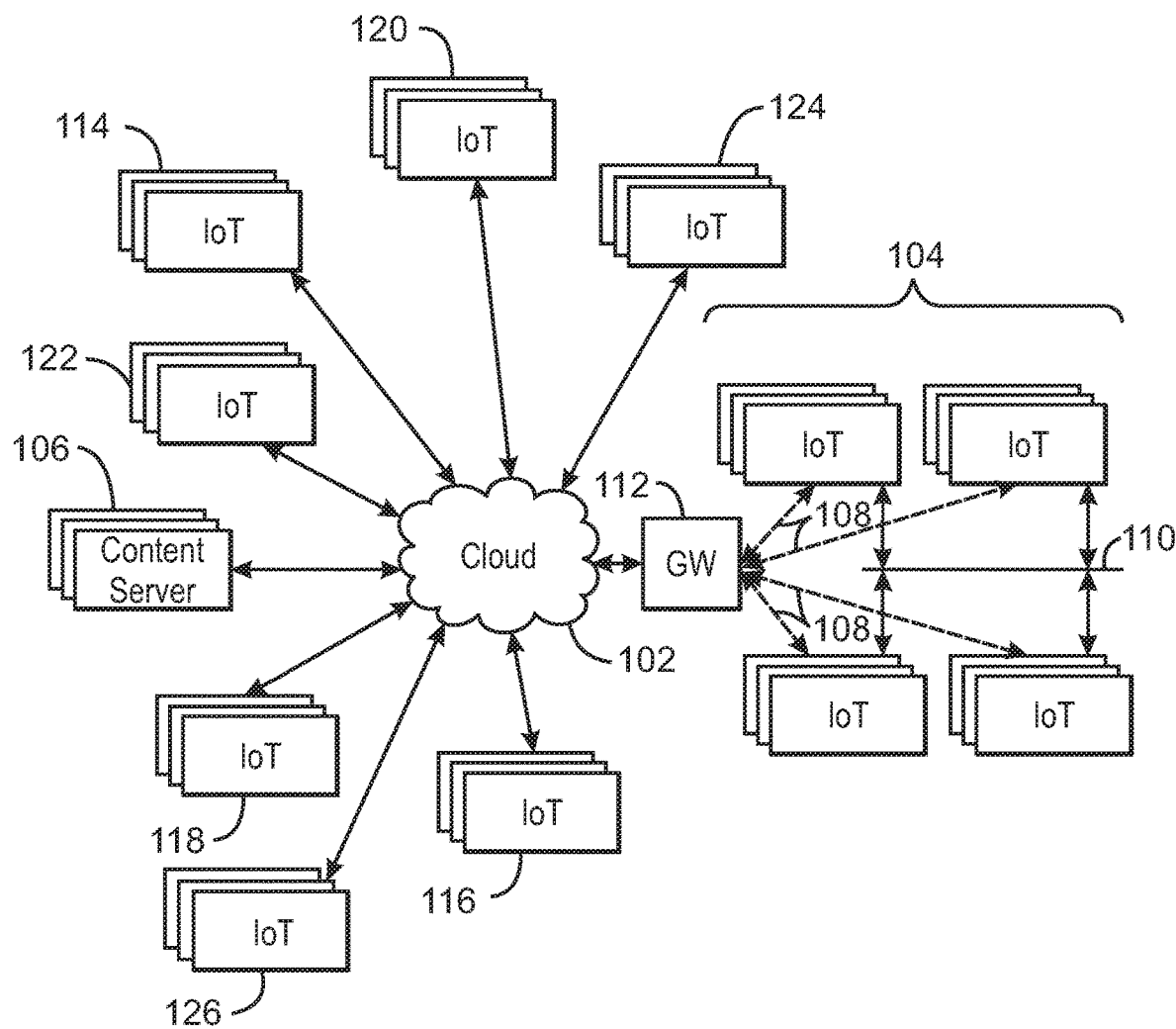
FIG. 1 is a drawing of an example of a cloud computing network, or cloud, in communication with a number of Internet of Things (IoT) devices.

FIG. 1 is a drawing of a cloud computing network, or cloud 102, in communication with a number of Internet of Things (IoT) devices. The cloud 102 may represent the Internet, or may be a local area network (LAN), or a wide area network (WAN), such as a proprietary network for a company. The IoT devices may include any number of different types of devices, grouped in various combinations. For example, a media group 104 may include media devices such as displays in a video wall, intelligent whiteboards in a school, kiosks in a mall or airport, and the like. A content server 106 may provide media content to the media group 104, such as advertisements, videos, teaching content, information content requested by a viewer, and the like.

The media group 104, or other subgroups, may be in communication with the cloud 102 through links 108, such as a wired network link, a wireless radio network, and the like. Further, a wired or wireless sub-network 110 may allow the media devices to communicate with each other, such as through a local area network, a wireless local area network, and the like. The media devices may use another device, such as a gateway 112 to communicate with the cloud 102. The gateway 112 may be an open pluggable specification plus (OPS+) media server, holding a number of OPS+ pluggable modules attached to a backplane. In this example, the links 108 may be through the backplane of the OPS+ media server.

Other groups of IoT devices may include remote weather stations 114, traffic control groups 116, alarm systems 118, automated teller machines 120, alarm panels 122, or moving vehicles, such as emergency vehicles 124 or other vehicles 126, among many others. Each of these IoT devices may be in communication with other IoT devices, with servers 104, or both.

As can be seen from FIG. 1, a large number of IoT devices may be communicating through the cloud 102. This may allow different IoT devices to request or provide information to other devices autonomously. For example, an IoT device in the media group 104 may request a current weather forecast from a group of remote weather stations 114, which may provide the forecast without human intervention, allowing it to be displayed on a video wall, a sign, or a display panel, among others. As another example, an emergency vehicle 124 may be alerted by an automated teller machine 120 that a burglary is in progress. As the emergency vehicle 124 proceeds towards the automated teller machine 120, it may access traffic control groups 116 to request clearance to the location, for example, by having a traffic control group 116 to change a traffic light to red to block cross traffic at the intersection in sufficient time for the emergency vehicle 124 to have unimpeded access. The media group 104 may display warnings of the traffic issues on signs in the vicinity of the event.

Further, the media group 104 may be a video wall in a traffic control center. In this example, the traffic issues may be displayed on a map across the video wall, wherein a video of the area where the traffic issues are taking place may be displayed near the location of the incident.

Clusters of IoT devices, such as the remote weather stations 114 or the media group 106, may be equipped to communicate with other IoT devices as well as with the cloud 102. This may allow the IoT devices to form an ad-hoc network between the devices, allowing them to function as a single device, which may be termed a fog device. This is discussed further with respect to FIG. 2.

Figure 2:
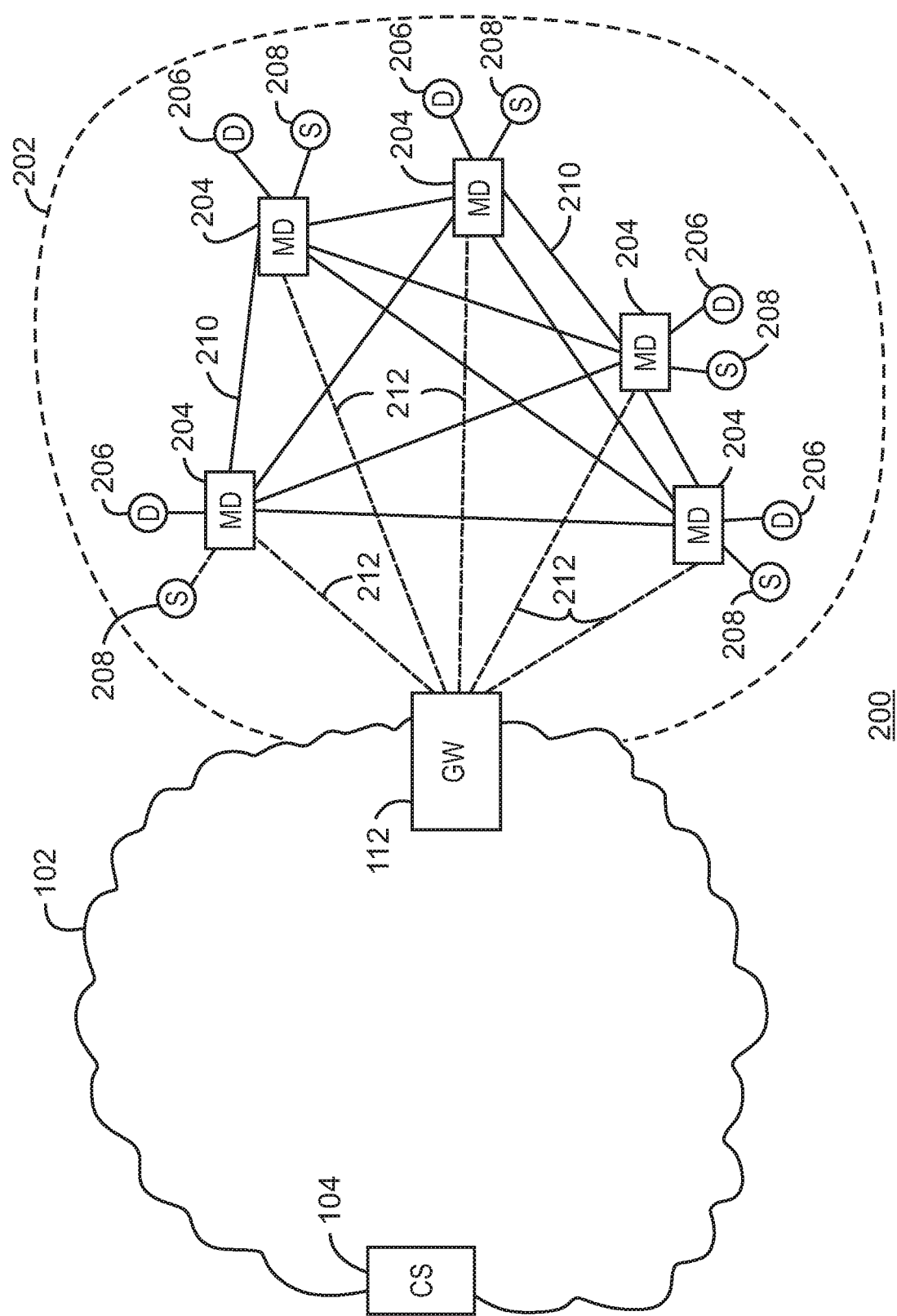
FIG. 2 is a drawing of an example of a cloud computing network, or cloud, in communication with a mesh network of IoT devices, which may be termed a fog device, operating at the edge of the cloud.

FIG. 2 is a drawing 200 of a cloud computing network, or cloud 102, in communication with a mesh network of IoT devices, which may be termed a fog device 202, operating at the edge of the cloud 102. Like numbered items are as described with respect to FIG. 1. In this example, the fog device 202 is a group of media devices 204, for example, in a video wall in a process control room, intelligent whiteboards in a school, kiosks in an airport or a shopping mall, or the like. The fog device 202 may be established in accordance with specifications released by the OpenFog Consortium (OFC), among others. These specifications allow the formation of a hierarchy of computing elements between the gateway 112 coupling the fog device 202 to the cloud 102 and to endpoint devices, such as displays 206 and sensors 208, in this example. It can be noted that the fog device 202 leverages the combined processing and network resources that the collective of media devices 204 provides. Accordingly, the fog device 202 may be used for any number of applications including, for example, a process control panel including a video wall, directed advertising, locating persons, providing information, and the like.

The fog device 202 may be a video wall, in which a series of screens or projectors, are displaying a single content or feed. The media devices 204 may share the rendering of data to provide smooth transitions between displays 206. The video wall, for example, may be a process control screen in a chemical plant. A sensor 208 may determine that a person is looking at a particular process unit on one of the displays 206 in a video wall. Depending on the length of time the person is looking at the content, the associated media device 204 may expand that portion of the display, and request additional content for the process unit. The media device 204 may share the contact with other media devices 204 in the fog device 202, allowing them to display related content, for example, from units providing feeds to, or accepting feeds from, the process unit.

Similar actions may be used to allow a person to deliberately select content. A sensor 208 may be used to detect that a person is directing a pointing device, such as a laser pointer, at a particular process unit. The region on the video wall that includes that particular unit may then be expanded to display over a larger region of the screen or display wall. Other selection actions may include circling a region on the video wall, which may trigger the fog device 202 to expand that region to cover the full video wall.

Any number of communication links 210 may be used between the media devices 204 in the fog device 202. The communication links 210 may be radio links, for example, compatible with IEEE 802.15.4, and the like. For installations that are fixed in place, such as a video wall, the links may be wire links or optical links, or through connections on a backplane in a media server. Longer-range links 212, for example, compatible with LPWA standards, among others, may provide communications between the media devices 204 and the gateway 112. In some examples, the gateway 112 may have wire or optical links to the media devices 204, for example, providing higher bandwidth. To simplify the diagram, not every communication link 210 or 212 is labeled with a reference number. As described herein, the gateway may be a media server that has a number of media devices plugged into the media server, similarly to blade processors plugged into a large-scale computing server.

The fog device 202 may be considered to be a massively interconnected network wherein a number of IoT devices are in communications with each other, for example, by the communication links 210 and 212. The network may be established using the open interconnect consortium (OIO) standard specification 1.0 released by the Open Connectivity Foundation™ (OCF) on Dec. 23, 2015. This standard allows devices to discover each other and establish communications for interconnects. Other interconnection protocols may also be used, including, for example, the AllJoyn protocol from the AllSeen alliance, the optimized link state routing (OLSR) Protocol, or the better approach to mobile ad-hoc networking (B.A.T.M.A.N.), among many others.

Communications from any media device 204 may be directed to other media devices 204 to reach the gateway 112. In these networks, the number of interconnections provide substantial redundancy, allowing communications to be maintained, even with the loss of a number of media devices 204. Further, sharing of communications may allow media devices 204 to be placed farther from the gateway 112. For example, in a school, a shopping mall, or an airport, some of the media devices 204 may be placed out of communication range from the gateway 112. In this example, media devices 204 that are closer to the gateway 112 may pass on content to more distant media devices 204.

The fog device 202 may be presented to clients in the cloud 102, such as the server 104, as a single device located at the edge of the cloud 102. In this example, the control communications to specific resources in the fog device 202 may occur without identifying any specific media device 204 within the fog device 202. Accordingly, if a media device 204 fails, other media devices 204 may be able to discover and display its content.

In some examples, the media devices 204 may be configured using an imperative programming style, for example, with each media device 204 having a specific function and communication partners. A first media device 204 in the fog device 202 may be used to display flight schedules, while a second media device 204 in the fog device 202 may be used to display a newsfeed. However, the media devices 204 forming the fog device 202 may be configured in a declarative programming style, allowing the media devices 204 to reconfigure their operations and communications, such as to determine needed resources in response to conditions, queries, and device failures. As an example, in case of a fire or other emergency, the fog device 202 may reconfigure all of the media devices 204 into an emergency instruction device, which may display emergency evacuation routes and information. In this example, the fog device 202 may automatically incorporate other devices such as smoke or fire sensors.

In a video wall, a portion of the media devices 204 may automatically reallocate to display information, for example, displaying control information for a particular portion of a processing facility. If an alert for that portion of the processing facility sounds, the media devices 204 may automatically reconfigure themselves to display that portion of the processing facility.

The media devices 204 may be specially built for the purpose. However, the use of a standard or reference device may lower cost and make implementation more economical.

Figure 3:
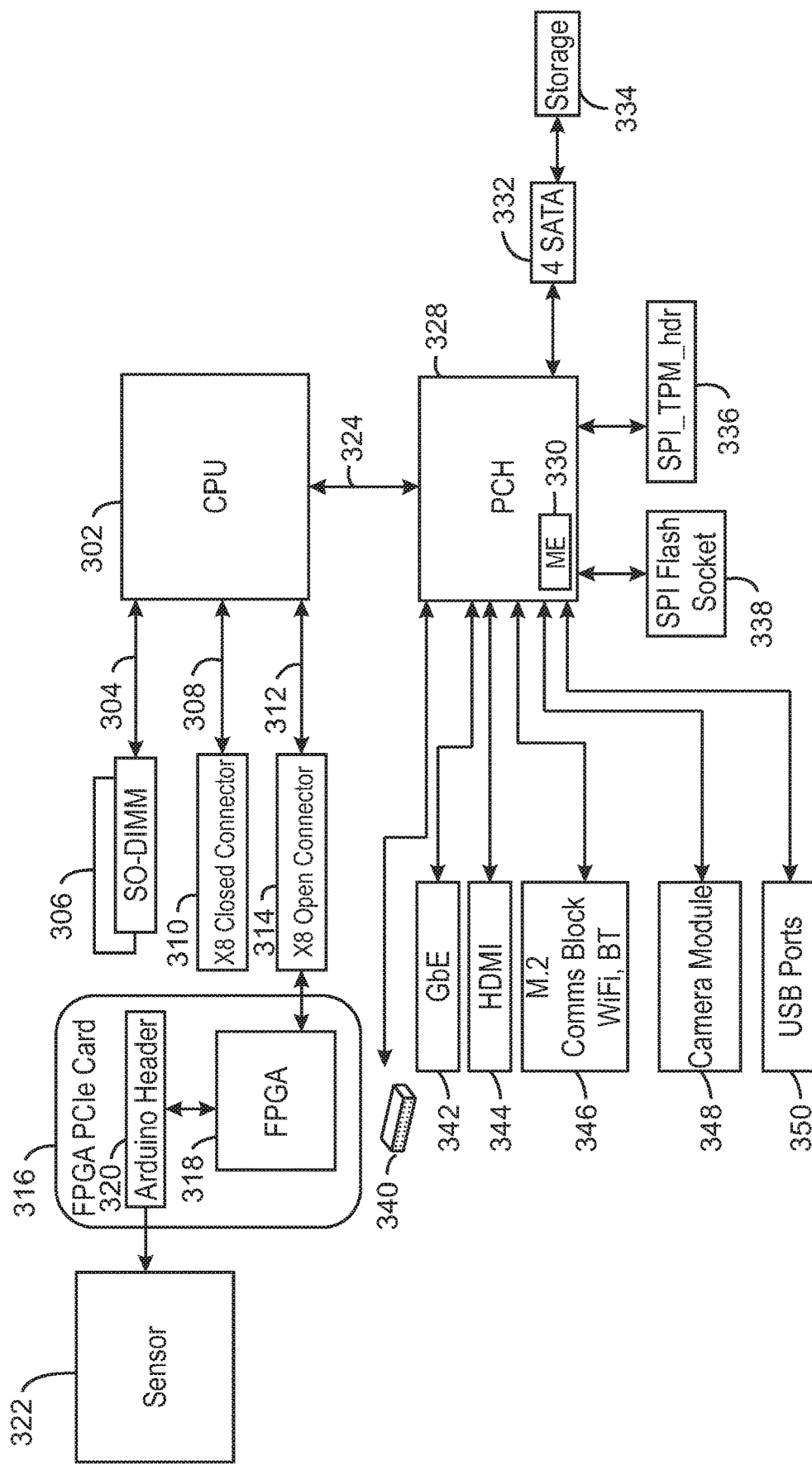
FIG. 3 is a block diagram of an example of a multi-use fog devicemulti-use fog device that may be used for media applications, as well as for more general purposes in fog devices.

FIG. 3 is a block diagram of an example of a multi-use fog device 300 that may be used for media applications, as well as for more general purposes in fog devices. The multi-use fog device 300 may include any combinations of the components shown in the example. The components may be implemented as ICs, portions thereof, discrete electronic devices, or other modules, logic, hardware, software, firmware, or a combination thereof adapted in the multi-use fog device 300, or as components otherwise incorporated within a chassis of a larger system. The block diagram of FIG. 3 is intended to show a high level view of components of the multi-use fog device 300. However, some of the components shown may be omitted, additional components may be present, and different arrangement of the components shown may occur in other implementations.

The multi-use fog device 300 may include a processor 302, which may be a microprocessor, a multi-core processor, a multithreaded processor, an ultra-low voltage processor, an embedded processor, or other known processing element. The processor 302 may be a part of a system on a chip (SoC) in which the processor 302 and other components are formed into a single integrated circuit, or a single package, such as the Edison™ or Galileo™ SoC boards from Intel. As an example, the processor 302 may include an Intel® Architecture Core™ based processor, such as a Quark™, an Atom™, an i3, an i5, an i7, a Xeon processor, or an MCU-class processor, or another such processor available from Intel® Corporation of Santa Clara, Calif. However, any number other processors may be used, such as available from Advanced Micro Devices, Inc. (AMD) of Sunnyvale, Calif., a MIPS-based design from MIPS Technologies, Inc. of Sunnyvale, Calif., an ARMbased design licensed from ARM Holdings, Ltd. or customer thereof, or their licensees or adopters. The processors may include units such as an A5-A9 processor from Apple® Inc., a Snapdragon™ processor from Qualcomm® Technologies, Inc., or an OMAP™ processor from Texas Instruments, Inc. Other processing technologies may he used in tandem with, or in place of, the processors shown. These may include computing clusters, virtual processors and graphics processing units (GPUs), such as those available from nVidia® of Santa Clara, Calif., among others.

The processor 302 may use a memory bus 304, such as high-speed, point-to-point links, to communicate with a system memory 306. Any number of memory devices may be used to provide for a given amount of system memory. As examples, the memory can be random access memory (RAM) in accordance with a Joint Electron Devices Engineering Council (JEDEC) low power double data rate (LPDDR)-based design such as the current LPDDR2 standard according to JEDEC JESD 209-2E (published April 2009), or a next generation LPDDR standard, such as LPDDR3 or LPDDR4 that will offer extensions to LPDDR2 to increase bandwidth. In various implementations the individual memory devices may be of any number of different package types such as single die package (SDP), dual die package (DDP) or quad die package (Q17P). These devices, in some embodiments, may be directly soldered onto a motherboard to provide a lower profile solution, while in other embodiments the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs. For example, a memory may be sized between 2 GB and 16 GB, and may be configured as a DDR3LM package or an LPDDR2 or LPDDR3 memory, which is soldered onto a motherboard via a ball grid array (BGA).

Point-to-point links 308 may be used to couple a PCIe connector 310 to the processor 302. For example, the PCIe connector 310 may be an x8 closed connector. This may be used to attach a field-programmable gate array (FPGA), for example, for video processing purposes, to the CPU 302.

Point-to-point links 312 may be used to couple the CPU 302 to another PCIe connector 314. In this case, PCIe port 314 may be an x8 closed connector, used to hold an FPGA PCIe card 316. The FPGA PCIe card 316 may include an FPGA chip 318 capable of assisting in video processing. The FPGA chip 318 may perform other functions, for example, providing an interface to an Arduino header 320. The Arduino header 320 may be used to support sensors 322. The sensors 322 may include cameras, motion sensors, position sensors, and sensors that may determine the location of a user, among others. Other sensors 322 may include temperature sensors, pressure sensors, barometric pressure sensors, and the like. The FPGA chip 318 may be the only processor in the system, for example, providing graphics processing support for other units.

Point-to-point links 324 may couple the processor 302 to a platform controller hub (PCH) 328. The PCH 328 may be used to couple the CPU 302 to a number of different devices for additional functionality. These devices may be selected to customize the multi-use fog device 300 for specific applications. The PCH 328 may couple a management engine (ME) 330 to the CPU 302. The ME 330 may provide tools for the active management of the system. These may include systems to determine the functionality of the multi-use fog device, replace operating system images in the multi-use fog device after failure, or access memory systems, among others, The PCH 328 may couple a number of serial ATA (SATA) ports 332 to the multi-use fog device 300. This enables the coupling of mass storage 334 to the multi-use fog device 300. The mass storage 334 may allow the persistent storage of information such as data, applications, operating systems and so forth. To enable a thinner and lighter system design the mass storage 334 may be implemented via a solid state drive (SSD). Other devices that may be used for the mass storage 334 include flash memory cards, such as SD cards, microSD cards, xD picture cards, and the like, and USB flash drives. The mass storage 334 may be implemented using a micro hard disk drive (HDD). Further, any number of new technologies may be used for the mass storage 334 in addition to, or instead of, the technologies described, such resistance change memories, phase change memories, holographic memories, or chemical memories, among others. For example, the media device 334 may incorporate the 3D XPOINT memories from Intel® and Micron®.

The PCH 328 may provide a serial peripheral interface (SPI) header 336 for attaching a trusted platform module (TPM). The TPM may be compliant with the specification promulgated by the Trusted Computing Group as ISO/IEC 11889 in 2009. The TMP may include a cryptographic processor (CP), non-volatile memory (NVM), and secure memory (SM). The CP may provide a random number generator, an RSA hash generator, a SHA-1 hash generator, and an encryption-decryption engine, among others. The NVM may include keys programed at the time of manufacture that include, for example, an RSA key, among others.

The SM may hold measurements taken on software in platform configuration registers. As used herein, a measurement is a hash code calculated on a code or data segment stored in the storage or memory. Starting from a measurement of a boot code segment, the measurements may be used to establish a trusted execution environment (TEE), by creating a chain-of-trust from the initial booting. In addition to providing an SPI header 336 to couple to the TPM, the PCH 328 may provide an SPI flash socket 338 for the attachment of a secure flash memory.

The PCH 328 may allow the multi-use fog device 300 to couple to any number of other interface units, depending on the needs of the application. For example, the PCH 328 may provide a number of general-purpose I/O (GPIO) lines 340 for controlling other units. These may be configured for binary input or output. For example, the GPIO lines 340 may be used to connect the multi use fog device 300 to actuators, such as power switches, an audible sound generator, a visual warning device, and the like.

The PCH 328 may couple to a network interface controller (NIC) to allow a network 342 to couple to the multi-use fog device 300. The network 342 may provide a wired or optical gigabit Ethernet (GbE) connection. In addition to an Ethernet connection, any number of other types of networks may be included, such as Controller Area Network (CAN), Local Interconnect Network (LIN), DeviceNet, ControlNet, Data Highway+, PROFIBUS, or PROFINET, among many others. Additional NICs may be included to allow connections to additional networks, for example, a first NIC may provide communications over Ethernet, while a second NIC provides communications to other devices over another type of network.

The PCH 328 may provide one or more high-definition multimedia interface (HDMI) 344 lines for sending video to display panels. The HDMI 344 may also include display port type connections. The HDMI 344 lines may be compatible with the HDMI 1.0 or 2.0 standards.

The PCH 328 may couple the multi-use fog device 302 any number of wireless transceivers 346. The wireless transceivers 346 may use any number of frequencies and protocols, such as 2.4 gigahertz (GHz) transmissions under the IEEE 802.15.4 standard, using the Bluetooth® low energy (BLE) standard, as defined by the Bluetooth® Special Interest Group, or the ZigBee® standard, among others. Any number of transceivers, configured for a particular wireless communication protocol, may be used for the connections to other devices. For example, a WLAN unit may be used to implement Wi-Fi™ communications in accordance with the Institute of Electrical and Electronics Engineers (IEEE) 602.11 standard. In addition, wireless wide area communications, e.g., according to a cellular or other wireless wide area protocol, can occur via a WWAN unit.

The wireless transceivers 346 may communicate using multiple standards or radios for communications at different range. For example, the multi-use fog device 300 may communicate with close devices, e.g., within about 10 meters, using a local transceiver based on BLE, or another low power radio, to save power. More distant devices, e.g., within about 50 meters, may be reached over ZigBee or other intermediate power radios. Both communications techniques may take place over a single radio at different power levels, or may take place over separate transceivers, for example, a local transceiver using BLE and a separate mesh transceiver using ZigBee.

Other transceivers may be included in the wireless transceivers 346 for communication with still more distant devices. For example, the wireless transceivers 346 may include a low power wide array (LPWA) transceiver that follows the IEEE 802.15.4, IEEE 802.15.4g, IEEE 802.15.4e, IEEE 802.15.4k, or NB-IoT standards, among others. The multi-use fog device 300 may communicate over a wide area using LoRaWAN™ (Long Range Wide Area Network) developed by Semtech and the LoRa Alliance. The techniques described herein are not limited to these technologies, but may be used with any number of other wireless transceivers 346 that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned. For example, the wireless transceivers 346 may include an LTE or other cellular transceiver that uses spread spectrum (SPA/SAS) communications for implementing high-speed communications, such as for video transfers. Further, any number of other protocols may be used, such as Wi-Fi® networks for medium speed communications, such as still pictures, sensor readings, and provision of network communications.

The wireless transceivers 346 may include transceivers that are compatible with any number of 3GPP (Third Generation Partnership Project) specifications, notably Long Term Evolution (LTE), Long Term Evolution-Advanced (LTE-A), Long Term Evolution-Advanced Pro (LTE-A Pro), or Narrow Band IoT (NB-IoT), among others. It can be noted that transceivers compatible with any number of other fixed, mobile, or satellite communication technologies and standards may be selected. These may include, for example, any Cellular Wide Area radio communication technology, which may include e.g. a 5th Generation (5G) communication systems, a Global System for Mobile Communications (GSM) radio communication technology, a General Packet Radio Service (GPRS) radio communication technology, or an Enhanced Data Rates for GSM Evolution (EDGE) radio communication technology. Other Third Generation Partnership Project (3GPP) radio communication technology that may be used includes UMTS (Universal Mobile Telecommunications System), FOMA (Freedom of Multimedia Access), 3GPP LTE (Long Term Evolution), 3GPP LTE Advanced (Long Term Evolution Advanced), 3GPP LTE Advanced Pro (Long Term Evolution Advanced Pro)), CDMA2000 (Code division multiple access 2000), CDPD (Cellular Digital Packet Data), Mobitex, 3G (Third Generation), CSD (Circuit Switched Data), HSCSD (High-Speed Circuit-Switched Data), UMTS (3G) (Universal Mobile Telecommunications System (Third Generation)), W-CDMA (UMTS) (Wideband Code Division Multiple Access (Universal Mobile Telecommunications System)), HSPA (High-speed Packet Access), HSDPA (High-Speed Downlink Packet Access), HSUPA (High-Speed Uplink Packet Access), HSPA+ (High-speed Packet Access Plus), UMTS-TDD (Universal Mobile Telecommunications System—Time-Division Duplex), TD-CDMA (Time Division—Code Division Multiple Access), TD-SCDMA (Time Division—Synchronous Code Division Multiple Access), 3GPP Rel. 8 (Pre-4G) (3rd Generation Partnership Project Release 8 (Pre-4th Generation)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP LTE Extra, LTE Licensed-Assisted Access (LAA), UTRA (UMTS Terrestrial Radio Access), E-UTRA (Evolved UMTS Terrestrial Radio Access), LTE Advanced (4G) (Long Term Evolution Advanced (4th Generation)), cdmaOne (2G), CDMA2000 (3G) (Code division multiple access 2000 (Third generation)), EV-DO (Evolution-Data Optimized or Evolution-Data Only), AMPS (1G) (Advanced Mobile Phone System (1st Generation)), TACS/ETACS (Total Access Communication System/Extended Total Access Communication System), D-AMPS (2G) (Digital AMPS (2nd Generation)), PTT (Push-to-talk), MTS (Mobile Telephone System), IMTS (Improved Mobile Telephone System), AMTS (Advanced Mobile Telephone System), OLT (Norwegian for Offentlig Landmobil Telefoni, Public Land Mobile Telephony), MTD (Swedish abbreviation for Mobiltelefonisystem D, or Mobile telephony system D), Autotel/PALM (Public Automated Land Mobile), ARP (Finnish for Autoradiopuhelin, "car radio phone"), NMT (Nordic Mobile Telephony), Hicap (High capacity version of NTT (Nippon Telegraph and Telephone)), CDPD (Cellular Digital Packet Data), Mobitex, DataTAC, iDEN (Integrated Digital Enhanced Network), PDC (Personal Digital Cellular), CSD (Circuit Switched Data), PHS (Personal Handyphone System), WiDEN (Wideband Integrated Digital Enhanced Network), iBurst, Unlicensed Mobile Access (UMA, also referred to as also referred to as 3GPP Generic Access Network, or GAN standard)), Wireless Gigabit Alliance (WiGig) standard, mmWave standards in general (wireless systems operating at 10-90 GHz and above such as WiGig, IEEE 802.11ad, IEEE 802.11ay, and the like. In addition to the standards listed above, any number of satellite uplink technologies may be used for the uplink transceiver 614, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated.

The PCH 328 may allow the multi-use fog device 300 to couple to a camera module 348. The camera module 348 may be a still image camera, a video camera, or a three-dimensional camera, such as the RealSense™ camera available from Intel®, among others. Other camera modules, such as infrared cameras, hyperspectral cameras, or other types of cameras, may also be used.

The PCH 328 may also be used to provide any number of universal serial bus (USB) ports 350. These may include ports that are compatible with USB 2.0 or USB 3.0.

The interfaces described above may be customized and grouped into sets and provided to specific connectors, for example, to be compatible with the open pluggable specification (OPS) or an enhanced video OPS, termed OPS+. Thus the multi-use fog device 300 may be used to create an OPS+ module that includes two active connectors for video output. A first connector provides a video output that is compatible with the basic open pluggable specification (OPS). A second connector provides a video output that is enhanced with respect to resolution or image speed. The OPS+ module may be compatible with the current OPS for video output and for size.

The first connector may include a power line to power the multi-use fog device 300. The multi-use fog device 300 may include a battery for backup purposes, for example, to maintain memory contents, communications, and the like. The use of a battery may accelerate restarting the system after power failure. The battery may be a lithium ion battery, a metal-air battery, such as a zinc-air battery, an aluminum-air battery, a lithium-air battery, a hybrid super-capacitor, and the like.

In some examples, a power block, or other power supply coupled to a grid, may be used to power the multi-use fog device 300 and to charge a battery, if present. In some examples, the power block may be replaced with a wireless power receiver to obtain the power wirelessly, for example, from a display panel or a media server through a loop antenna in the multi-use fog device 300. The specific charging circuits chosen may depend on the current required. The power may be provided using the Airfuel standard promulgated by the Airfuel Alliance, the Qi wireless charging standard promulgated by the Wireless Power Consortium, or the Rezence charging standard, promulgated by the Alliance for Wireless Power, among others.

Figure 4:
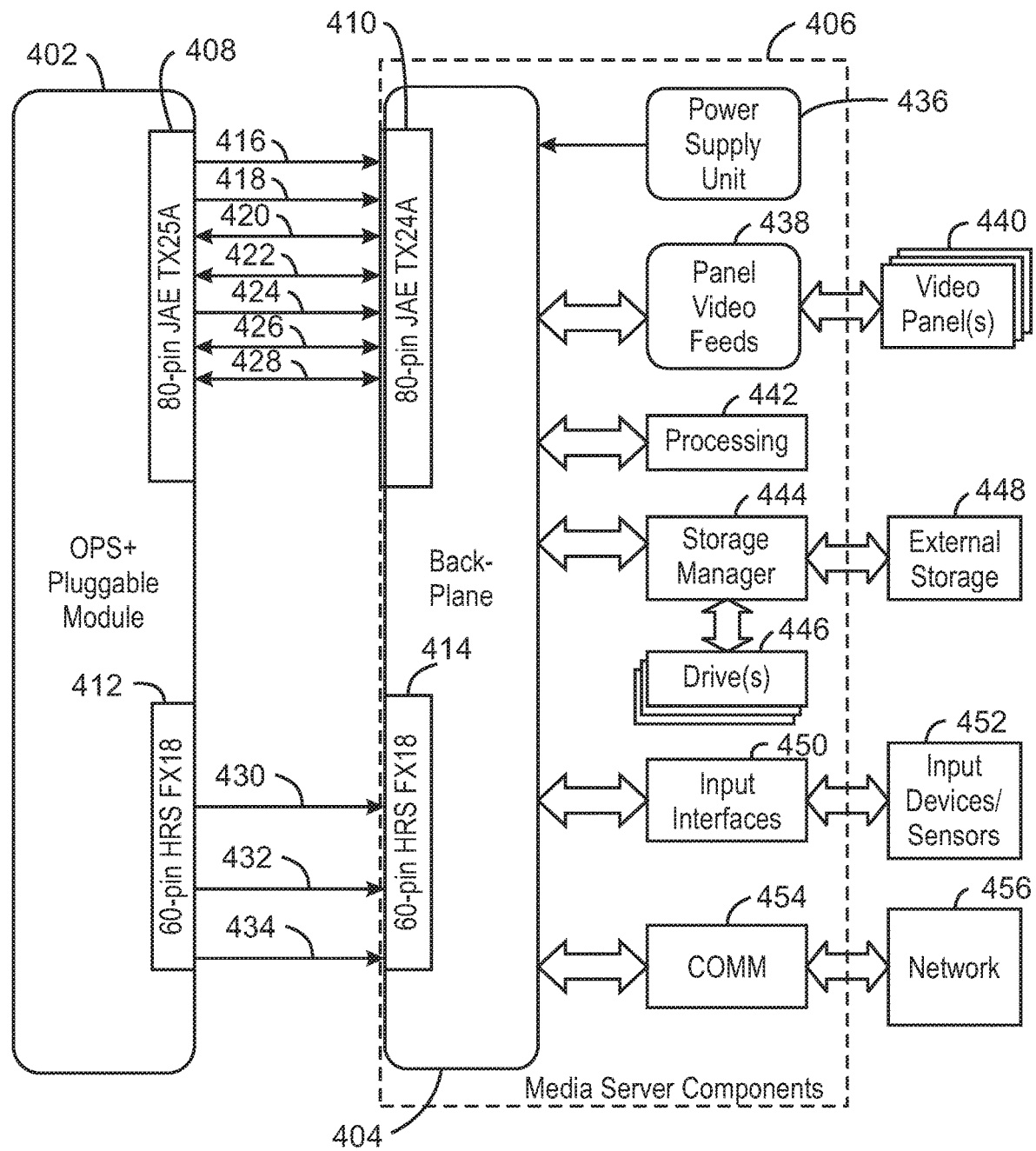
FIG. 4 is a schematic diagram of an OPS+ pluggable module interfaced to a backplane in a media server.

FIG. 4 is a schematic diagram 400 of an OPS+ pluggable module 402 interfaced to a backplane 404 in a media server 406. A first connector 408 on the OPS+ pluggable module 402 is electrically coupled to a mated connector 410 on the backplane 404. A second connector 412 may also be electrically coupled to a mated connector 414 on the backplane 404. The connectors 408-414 include a number of signal lines for providing video and control from the OPS+ pluggable module 402 to the media server 406. These may include lines 416 providing video signals, for example, in a transition-minimized differential signaling (TMDS) format, such as HDMI connections. Other video lines 418 may carry information for a display port connection. Serial communications may take place between the media server 406 and the OPS+ pluggable module 402 over universal asynchronous receiver/transmitter (UART) lines 420. USB lines 422 may be used to provide a connection to USB ports on the OPS+ pluggable module 402. Audio lines 424 may carry audio signals from the OPS+ pluggable module 402 to the media server 406. Specific control lines 426 may be used to control various functions of the media server 406 and the OPS+ pluggable module 402, for example, allowing the media server 406 to trigger a shutdown of the OPS+ pluggable module 402 to allow removal. Power lines 428 may provide power to the OPS+ pluggable module 402 from the media server 406.

The second connector 412 may include a number of lines that enhance the video feeds, provide further interfaces, and provide additional control lines. These may include video lines 430 that may provide video signals at up to 8 K at 60 Hz or multiple HDMI 2.0 signals providing 4 K at 120 Hz. Interface lines 432 may provide a PCIe x4 or a USB 3.0 port. Additional general purpose I/O (GPIO) lines 434 may be included for configuration by user.

In addition to the backplane 404, the media server 406 may include a number of other functional units. For example, a power supply unit 436 may be included to provide power to both the media server 406 and, through the docking board 404, to the OPS+ pluggable module 402. Display panel video feeds 438 may pass video and control signals from the OPS+ pluggable module 402, or other OPS+ pluggable modules coupled to the backplane 404, to individual video panels 440.

A processing system 442 may provide services to the OPS+ pluggable module 402, and other OPS+ pluggable modules, inserted into the media server 406. These services may include obtaining content for the OPS+ pluggable module 402, facilitating communications between multiple OPS+ pluggable modules, providing rendering services for content that crosses video panels 404 serviced by multiple OPS+ pluggable modules, and the like. The processing system 442 may be similar to the processor 302 described with respect to FIG. 3, and may include any number of different processing units, such as Xeon processors available from Intel®, among others. The processing system 442 may be in cloud configurations, may be virtualized, and may include a group of processors, depending on the processing needs of the media server 406.

A storage manager 444 may provide storage for the media server 406, and attached OPS+ pluggable modules. The storage manager 444 may control internal storage drives 446, may interface to external storage 448, such as network storage, and the like, or both. The external storage 448 and internal drives 446 may be as described with respect to the storage 334 of FIG. 3.

The media server 406 may include input interfaces 450 for coupling to input devices or sensors 452. The input devices or sensors 452 may include a mouse, a keyboard, a three-dimensional camera, motion sensors, and virtual reality devices, such as VR gloves, VR shutter glasses, VR polarization glasses, and the like.

The media server 406 may include communication devices 454, such as a network interface controller (NIC) or transceivers. The communication devices 454 may provide a link to a network 456, such as an optical or wired network, a Wi-Fi network, or the like. Multiple NICs may be included to provide higher bandwidth connections for obtaining content for the OPS+ pluggable modules coupled to the backplane 404 of the media server 406. Further, multiple networks 456 may be accessed, with one set of networks 456 to provide content, and another set of networks 456 to provide communications between the media server 406 and other media servers, or individual OPS+ pluggable modules installed the display panels.

Figure 5:
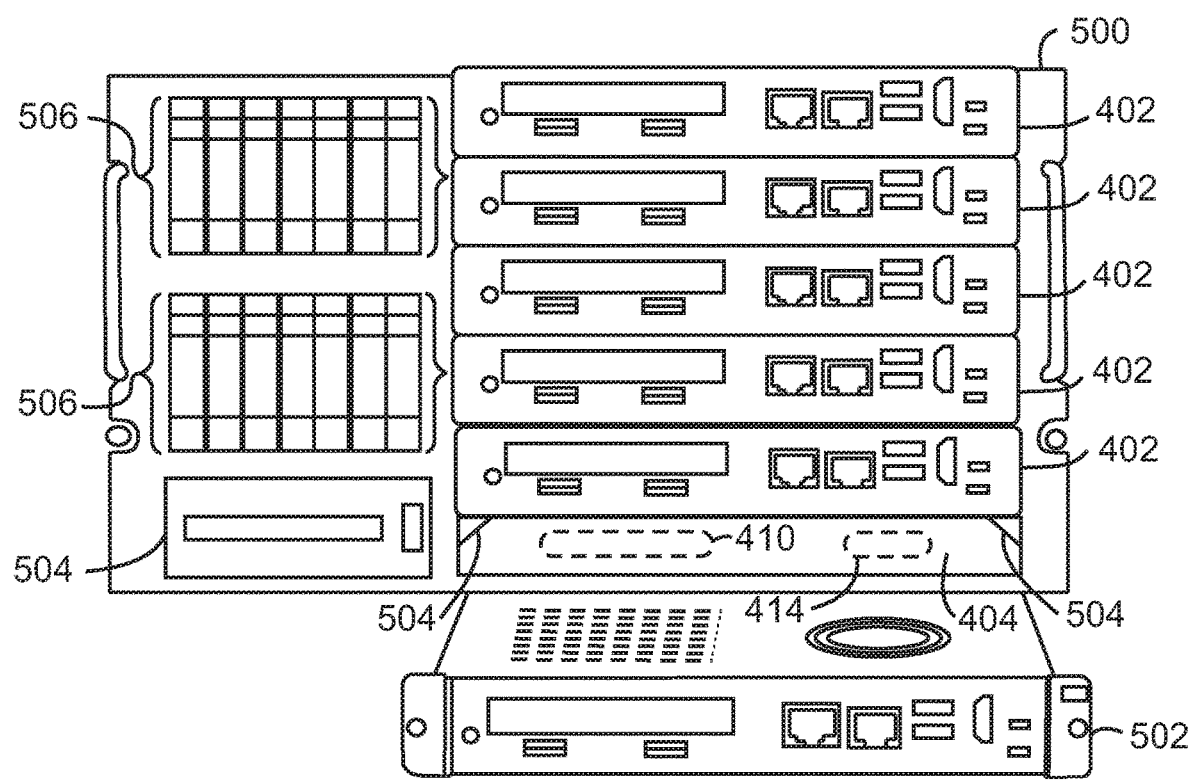
FIG. 5 is a drawing of an example of a media server.

FIG. 5 is a drawing of an example of a media server 500. Like numbered items are as described with respect to FIG. 4. In this example, five OPS+ pluggable modules 402 are already inserted into the media server 500.

A sixth OPS+ pluggable module 502 is ready to be inserted into the media server 500. The OPS+ pluggable module 502 may be slid into the media server 500 along rails 504 that engage rails on the sides of the OPS+ pluggable module 502. The OPS+ pluggable module 502 includes connectors on the back, which engage connectors 410 and 414 on the backplane 404 of the media server 500. Also shown in this example, is an optical drive 504 for loading content on to the media server 500. Further, additional units 506 may provide additional memory, additional long term storage. The additional units 506 may include blade servers to provide processing power. It may be noted that the media server is not limited to five OPS+pluggable modules, but may have any number of OPS+ pluggable modules depending on the size.

Figure 6:
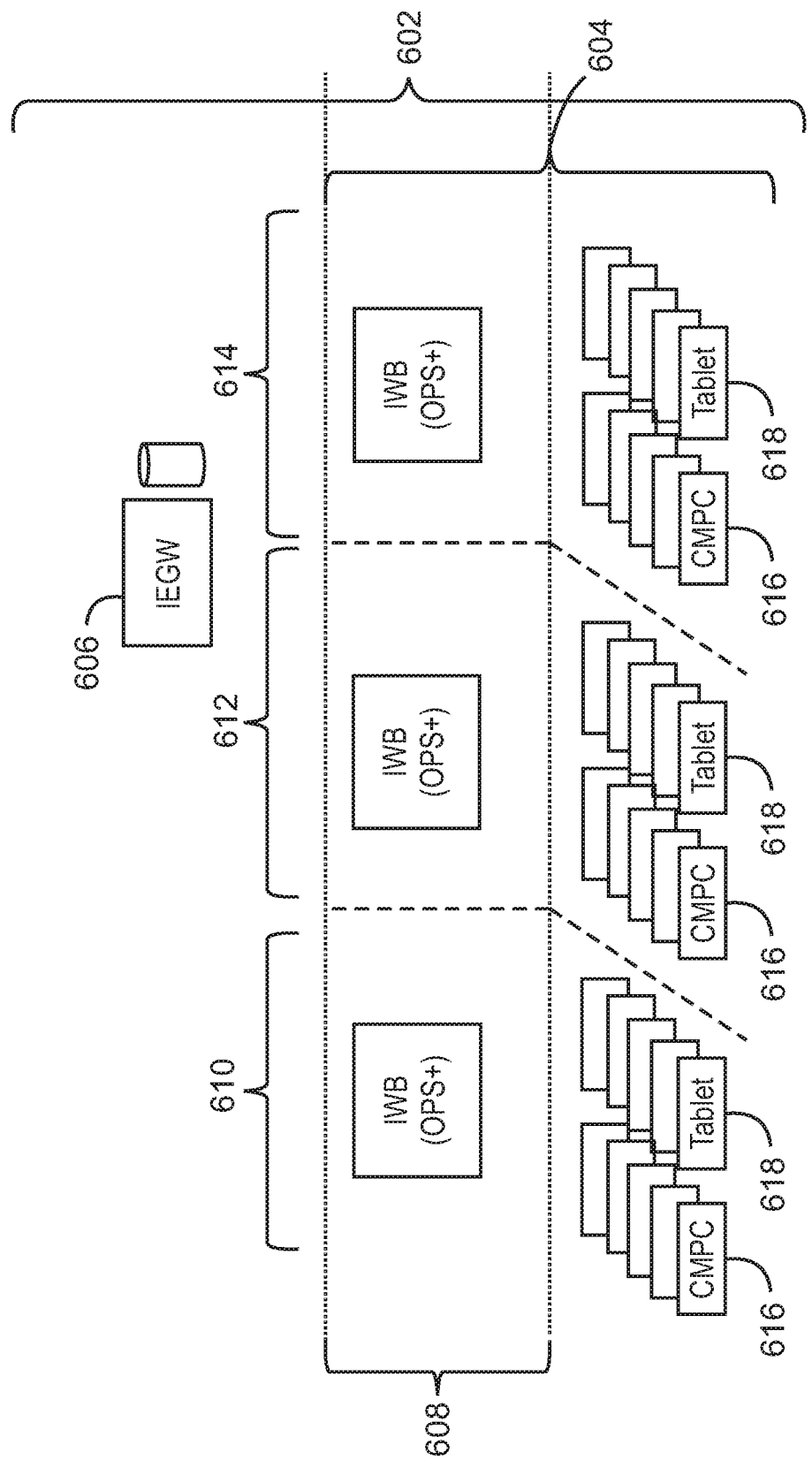
FIG. 6 is a block diagram of an example of a school environment with a video infrastructure, that may provide content to the classroom level from a media server.

FIG. 6 is a block diagram of an example of a school environment 600 with a video infrastructure 602, that may provide content to a classroom domain 604 from a media server. In this case, the media server is an edge computing gateway (IEGW) 606. The IEGW 606 may obtain educational content from a school district server, other IEGW servers in other schools, or from servers in the cloud. The IEGW 606 may synchronize the educational content between the school and a district level server, manage revisions to the educational content, provide inventory management for the education content, and synchronize the educational content across multiple devices. Placing the content server, or IEGW 606, in the school environment improves the utilization of the network, and lowers network latency by making the server closer to the final clients.

At the classroom level 604, each classroom 610, 612, or 614 may be managed by an intelligent whiteboard (IWB) 608, which may be a large display panel with drawing sensor inputs. Each of the IWBs 608 may be controlled by an individual OPS+ pluggable module, which may be physically located in the IEGW 606. In some examples, and OPS+ pluggable module may be inserted into the display panel that functions as the IWB 608 in the classroom 610, 612, or 614. The decision where to locate the OPS+ pluggable module may depend on the physical location and proximity to the IEGW 606. For example, if a classroom 610 is located adjacent to a media room that includes the IEGW 606, the OPS+ pluggable module may be located in the IEGW 606, with video and sensor lines feeding the IWB 608 in the classroom 610. If classrooms 612 and 614 are located more distantly from the IEGW 606, the OPS+ pluggable module that powers the IWB 608 in each classroom may be plugged into the IWB 608, with a wired or wireless network connection to the IEGW 606.

The use of the IEGW 606 with the independent OPS pluggable modules that control each IWB 608 may allow any number of different functions to be carried out for the educational content. For example, the media server may allow the transcoding of video streams from one video format to another video format, such as converting 480i video to feed 1080p display panels or converting video in one codec to another codec. Other functions may include hardware encoding and decoding to accelerate the transfer of video contents, the on-demand delivery of high-quality content, and the use of live broadcasting and videoconferencing, across the school environment 602 or from district servers.

The IWB 608 in each classroom 610, 612, and 614 may be used to feed content to a number of other units. These may include classroom media personal computers (CMPC) 616 and tablets 618. Further, the IWB 608 in each classroom 610, 612, and 614 may be used to provide educational applications that may provide interactivity to each user. The CMPC 616 and tablets 618 may use content players, browser apps, and interactivity applications, among others, to receive and display the content.

Figure 7:
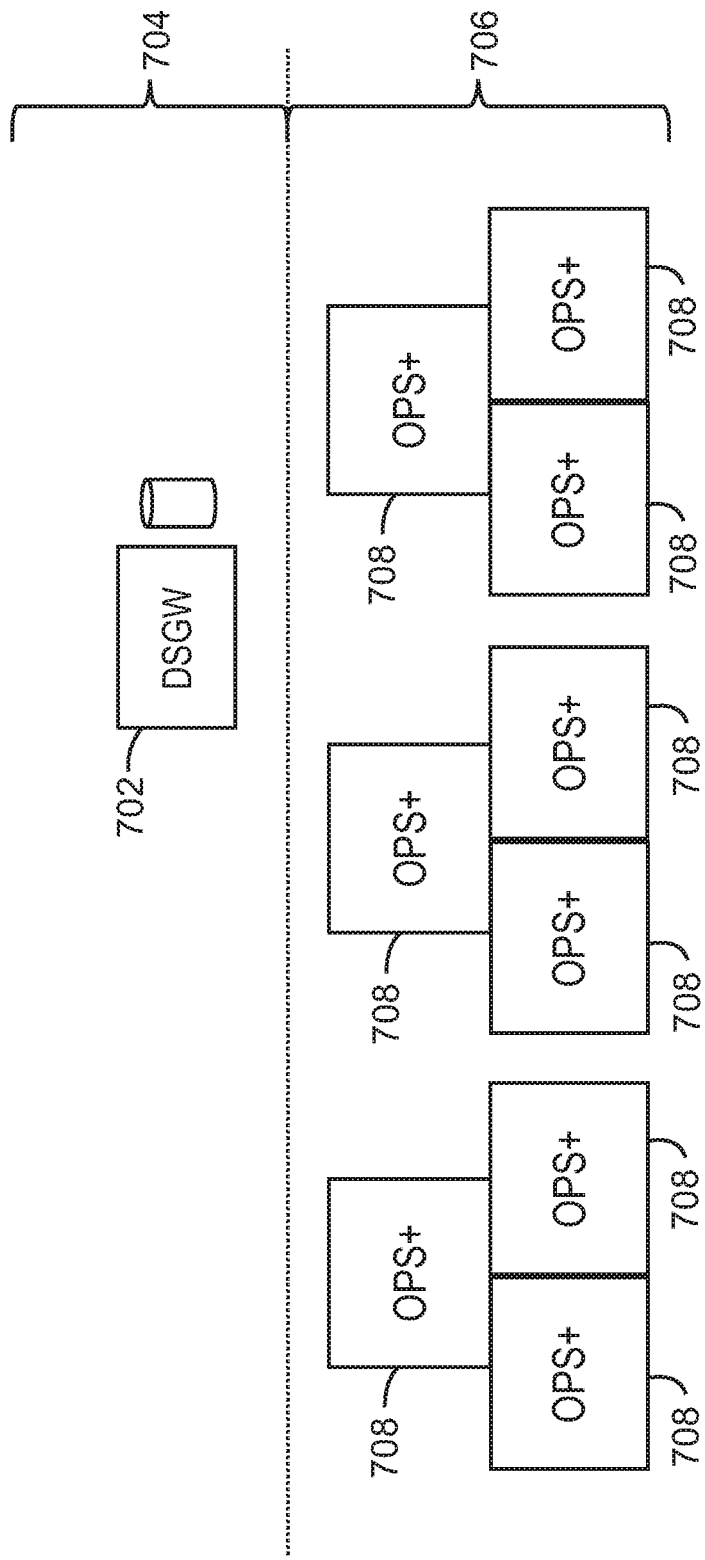
FIG. 7 is a block diagram of an example of a video wall with a video infrastructure provided by a media server, termed a digital sign gateway (DSGW) herein.

FIG. 7 is a block diagram of an example of a video wall 700 with a video infrastructure provided by a media server, termed a digital sign gateway (DSGW) 702 herein. It can be noted that the video wall 700 does not need to be used in an advertising or a digital sign application, but may be used in any number of environments, such as process control, entertainment, and the like.

The DSGW 702 is part of a management domain 704 that may provide central computing, management, and storage services for the video wall 700. These services may include obtaining content and managing the content. Other services may include the streaming of audiovisual (AV) content, including transcoding of the AV content, encoding of the AV content, and decoding of the AV content, among others. Other services may include content synchronization, content caching, traffic utilization, content filtering, and user input control, among others.

A display domain 706 may include a number of OPS+ pluggable modules 708, with each OPS+ pluggable module 708 supporting a single display panel, or projector, for the video wall. Depending on the resolution, in some examples, an OPS+ pluggable module 708 may support multiple display panels or projectors. The OPS+ pluggable module 708 may provide independent interactivity for each display panel. The OPS+ pluggable module 708 may be mounted in the DSGW 702, with a video and sensor cable run to each of the display panels.

Figure 8:
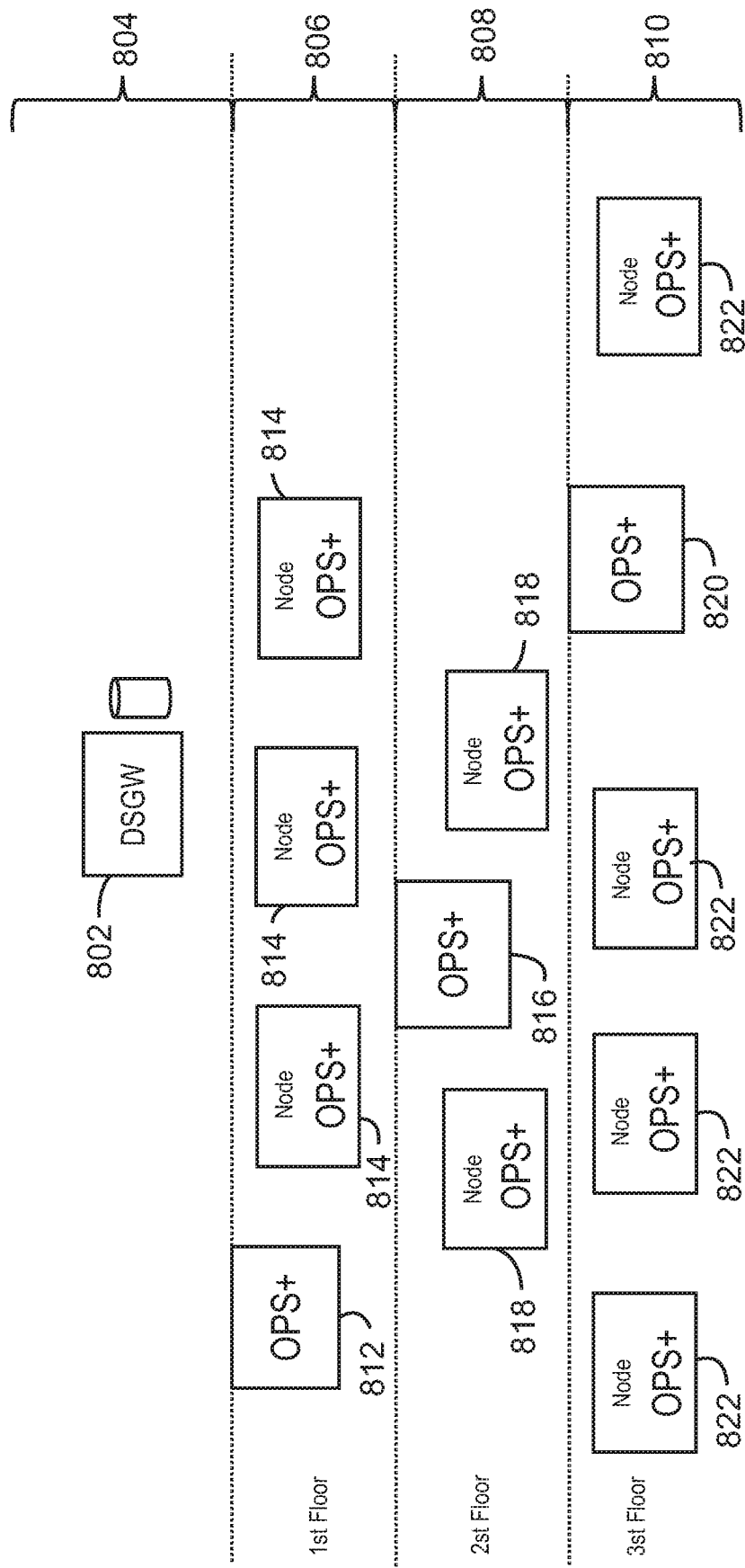
FIG. 8 is a block diagram of an example of a multi-kiosk implementation with the video infrastructure provided by a media server.

FIG. 8 is a block diagram of an example of a multi-kiosk implementation 800 with the video infrastructure provided by a media server. In this example, the DSGW 802 is in a management domain 804 that provides content to the entire facility, such as a shopping mall or airport, among others. As described with respect to FIG. 7, the management domain 804 may provide central computing, management, and storage services for the multi-kiosk implementation 800.

Each of the floors 806, 808, and 810 may comprise a single domain that includes a master media server. For example, the first floor 806 may have a master media server 812 that obtains content from the DSGW 802, and provides the content to each of three slave nodes 810. Each of the slave nodes 810 and the master media server 812 may be powered by an OPS+ pluggable module. Depending on the proximity of the slave nodes 810 to the master media server 812, the OPS pluggable modules for the slave nodes 810 may be located in the master media server 812.

A similar arrangement may be implemented for the second floor 808. As for the first floor 806, the second floor 808 may have a master media server 816 that obtains content from the DSGW 802, and provides the content to slave nodes 818 for display. The third floor 810 may have a similar arrangement with the master 820 obtaining content from the DSGW 802, and providing the content to slave nodes 822. As for the first floor 806, the slave nodes 818 or 822 for the second floor 808 and the third floor 810, may be located in a master media server 816 or 820, respectively.

The master media servers 812, 814, and 820 may also power an associated display panel. It can be noted that the arrangement shown above is not limited to a single display panel for single OPS+ pluggable module, as multiple display panels may be powered by each OPS+ pluggable module, depending on desired resolution. For example, each kiosk may be arranged in a triangle with a display panel along each edge of the triangle.

Figure 9:
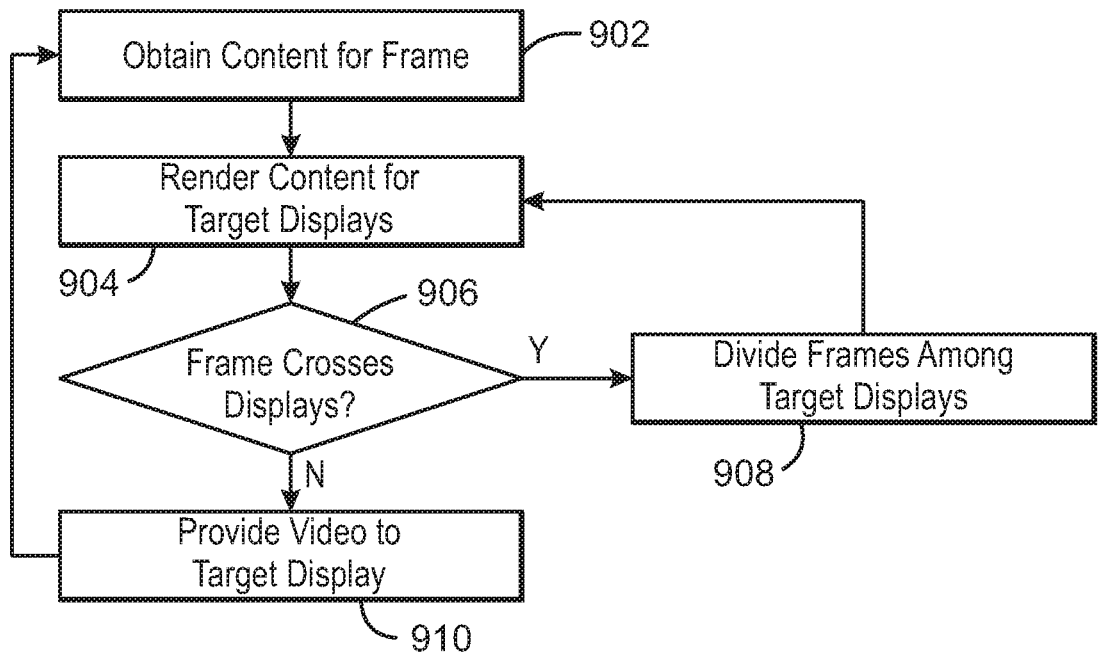
FIG. 9 is a process flow diagram of an example of a method for rendering content across a number of displays using a media server.

FIG. 9 is a process flow diagram of an example of a method 900 for rendering content across a number of displays using a media server. The method begins at block 902, when content is obtained, for example, for a frame. At block 904, the content may be rendered for the target display panels. This may be performed by media server, by a number of OPS+ pluggable modules working together, or both. At block 906, a determination is made as to whether a frame crosses display panels. If so, at block 908, the frame is rendered to be divided among the target display panels, for example, by alerting the OPS+ pluggable modules controlling the display panels that content crosses display panels. Process flow then returns to block 904 to confirm that the content has been correctly rendered for the target display panels. If all frames are properly rendered for the target display panels at block 906, at block 910, the video is provided for each of the target display panels. Process flow then returns to block 902 to process the content for the next frame.

Figure 10:
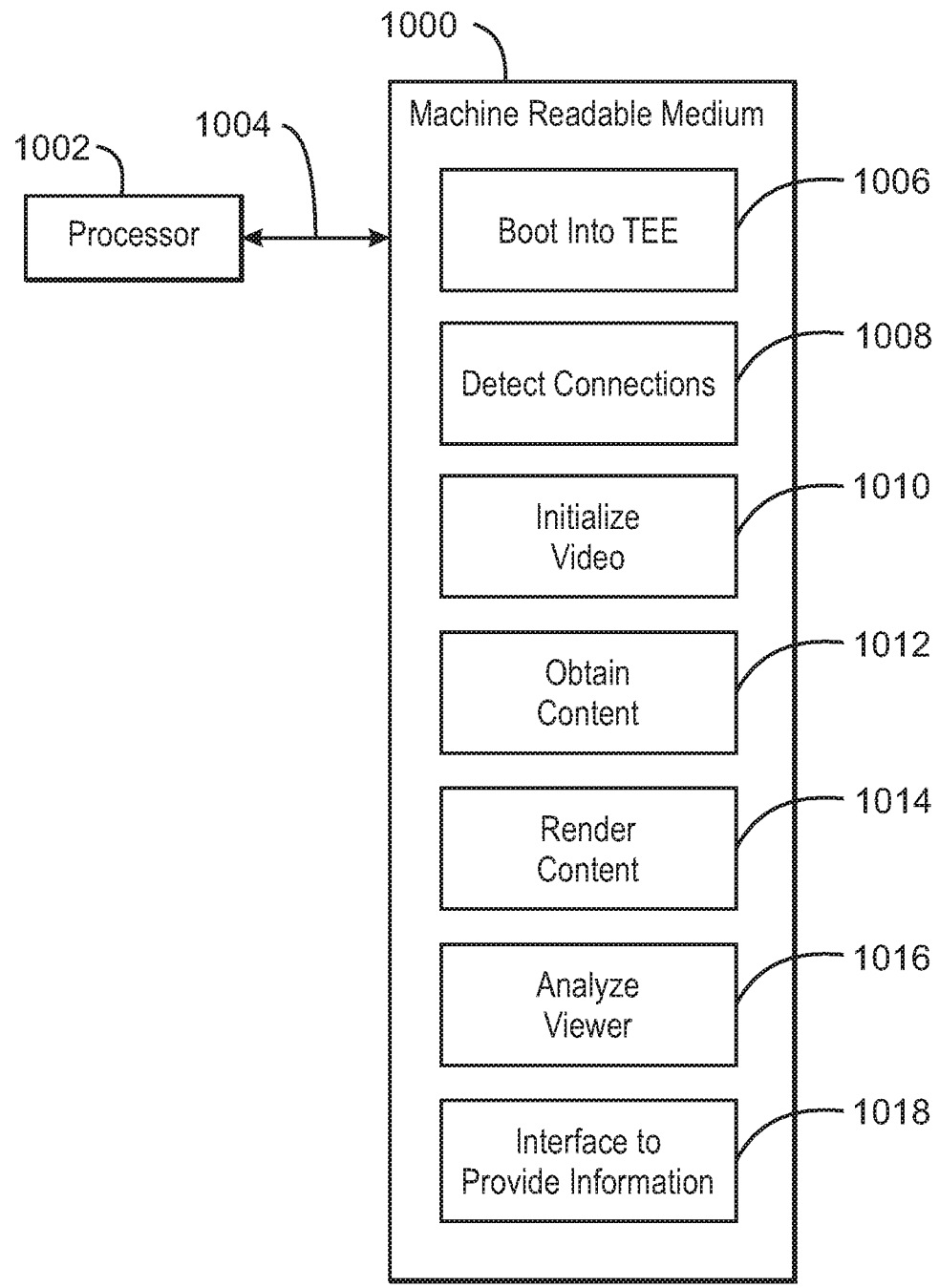
FIG. 10 is a block diagram of an example of a non-transitory, machine readable medium including code to direct a processor to display image data from an OPS+ pluggable module, a media server, or both.

FIG. 10 is a block diagram of an example of a non-transitory, machine readable medium 1000 including code to direct a processor 1002 to display image data from an OPS+ pluggable module, a media server, or both. Although shown as code blocks in the non-transitory, machine readable medium 1000, it may be understood that any of the modules may be replaced with hardwired circuits, for example, built into an application specific integrated circuit (ASIC). Further, the code blocks are not limited to the arrangement shown, but may be placed in any sort of combination to perform the functions desired.

The processor 1002 may access the non-transitory, machine readable medium 1000 over a bus 1004. The processor 1002 and the bus 1004 may be selected as described with respect to the processor 602 and bus 606 of FIG. 6. The non-transitory, machine readable medium 1000 may include devices described for the mass storage 608 of FIG. 6 or may include optical disks, thumb drives, or any number of other hardware devices.

The non-transitory, machine readable medium 1000 may include code 1006 to direct the processor 1002 to securely boot a media device, such as a media server or an OPS+ pluggable module, into a trusted execution environment (TEE). The code 1006 may direct the processor 1002 to perform measurements on code or data. An initial boot measurement may be performed by the processor 1002 to set up the TEE for additional measurements.

Code 1008 may be included to direct the processor 1002 to detect what connections are active between an OPS+ pluggable module and a media server. The code 1008 may direct the processor 1002 to determine if only a standard video connector is engaged, for example, indicating that it is an OPS pluggable module, or if both the standard video connector and an enhanced video connector are engaged indicating an OPS+ pluggable module is connected. If only the standard video connector is engaged, the code 1008 may direct the processor 1002 to alert the user. In some examples, and OPS pluggable module may be used in a media server, for example, if more limited functionality is acceptable.

Code 1010 may be included to direct the processor 1002 to initialize video feeds to a display panel depending on what connections are selected. The code 1010 may then direct the processor to set the parameters for providing the appropriate video through the connectors.

Code 1012 may be included to direct the processor 1002 to obtain content. The content may include advertisements, teaching information, shared video feeds for a video wall, and the like, and may be obtained from central servers, such as a district office in a school system, or other OPS+ pluggable modules. The code 1012 may also direct the processor to validate the identity of the media device, and the content provided to the media device.

Code 1014 may be included to direct the processor to render the content in an appropriate format for the display panel, and provide the content over the video connectors to a video panel, media server, or other OPS+ pluggable module. This may include, for example, transcoding a video stream to a different resolution for display. The code 1014 may also direct the processor 1002 to transfer portions of content that cross boundaries between display panels controlled by other OPS+pluggable modules.

Code 1016 may be included to direct the processor 1002 to use sensors to analyze a viewer, for example, determining the position of the viewer, the line of sight of the viewer, the motion of the viewer, the gender the viewer, and the like. The code 1016 may direct the processor 1002 to obtain content on the basis of the analysis. For example, if the measurements from the sensors determine that a line of sight for a user is directed to an informational block on a display panel, the code 1016 may direct the processor 1002 to obtain further information for that informational block, and expand the informational block on the screen. Other measurements that may be taken include determining a viewer's gender, an identity, a viewing time, or other parameters. The code 1016 may direct the processor 1002 to communicate with content trackers in other media devices in the fog 1012, and pass content associated with that user to those media devices.

Code 1018 may be included to direct the processor 1002 to provide an interface to the viewer for requesting specific information. For example, the code 1018 may direct the processor 1002 to accept an input from a laser pointer, a touchpad, or pointer among others. In some examples, the input may be determined by tracking a user's hand motions using a sensor.

Other code blocks may be present to provide functionality as needed. For example, a blockchain, or other distributed ledger system, may be included to secure communications. A blockchain is transactional database that includes blocks of data that have transactions corresponding to content, content links, other media devices, and the like. In addition to identification information, the blockchain may include authorization information, such as public encryption keys for group objects and sub-objects. A copy of the blockchain may be kept on a portion or all of the media devices in a mesh network. This allows other devices in the mesh network or fog to confirm changes in the blockchain and flag any attempts to change the blockchain without proper authorization. Further, the blockchain may be used for any number of other transactions related to security, payments, transactions, and the like, for example, as a viewer interacts with the displayed advertisement.

EXAMPLES

Example 1 provides an apparatus including a multi-use fog device. The multi-use fog device includes a processor to execute code segments and a field-programmable gate array (FPGA) card that is coupled to the processor through a PCIe interface. The FPGA card includes a header for connecting sensors to the multi-use fog device, and the FPGA card includes an FPGA that provides video processing for the multi-use fog device.

Example 2 includes the subject matter of example 1. In this example, the multi-use fog device includes a platform controller hub coupled to the processor through point-to-point links.

Example 3 includes the subject matter of either of examples 1 or 2. In this example, a platform controller hub couples the processor to a trusted platform module.

Example 4 includes the subject matter of any of examples 1 to 3. In this example, a platform controller hub couples the processor to a management engine.

Example 5 includes the subject matter of any of examples 1 to 4. In this example, a platform controller hub couples the processor to a serial peripheral interface (SPI) flash memory.

Example 6 includes the subject matter of any of examples 1 to 5. In this example, the platform controller hub couples the processor to a serial ATA (SATA) drive.

Example 7 includes the subject matter of any of examples 1 to 6. In this example, the multi-use fog device includes a first video connector to provide a video signal at a first quality, and a second video connector to provide a video signal at a second quality. The media device includes a connection detector that determines the quality of the video signal to provide based, at least in part, on whether only the first video connector is electrically connected or if both the first video connector and the second video connector are electrically connected.

Example 8 includes the subject matter of any of examples 1 to 7. In this example, the quality of a video signal includes a resolution, a frame rate, or both.

Example 9 includes the subject matter of any of examples 1 to 8. In this example, the multi-use fog device includes a video initializer to configure a video interface to provide the video signal through the first video connector, or through both the first and second connector.

Example 10 includes the subject matter of any of examples 1 to 9. In this example, the multi-use fog device includes a secure booter measurer to create a trusted execute environment (TEE).

Example 11 provides an apparatus including a media server. The media server includes a backplane including a pair of connectors at each one of a number of positions, wherein each pair of connectors is configured to accept a media module. The media server includes a number of panel video feeds, wherein each one of the panel video feeds provides a video feed to a video panel from a media module.

Example 12 includes the subject matter of example 11. In this example, the media module includes an OPS+ pluggable module.

Example 13 includes the subject matter of either of examples 11 or 12. In this example, the apparatus includes a number of media modules, wherein each of the media modules is providing a feed to a display panel.

Example 14 includes the subject matter of any of examples 11 to 13. In this example, the media server includes a storage manager to interface with internal storage, external storage, or both.

Example 15 includes the subject matter of any of examples 11 to 14. In this example, the media server includes a processing system to obtain content for a number of media modules.

Example 16 includes the subject matter of any of examples 11 to 15. In this example, the apparatus includes a media module. The media module includes a processor to execute code segments and a field-programmable gate array (FPGA) card that is coupled to the processor through a PCIe interface. The FPGA card includes a header for connecting sensors to the multi-use fog device, and an FPGA that provides video processing for the multi-use fog device.

Example 17 includes the subject matter any of examples 11 to 16. In this example, the media server includes an input interface to couple to input sensors.

Example 18 includes the subject matter of any of examples 11 to 17. In this example, the apparatus includes a school environment including a video infrastructure, wherein the media server provides content to an intelligent whiteboard located in classrooms.

Example 19 includes the subject matter of any of examples 11 to 18. In this example, the media server transcodes content for an intelligent whiteboard.

Example 20 includes the subject matter of any of examples 11 to 19. In this example, the apparatus includes a video wall including a media server providing content to a number of media modules.

Example 21 includes the subject matter of any of examples 11 to 20. In this example, each media module provides video for a display panel in the video wall.

Example 22 includes the subject matter of example 11. In this example, the apparatus includes a multi-kiosk implementation including a video infrastructure, wherein the media server provides content to a number of master media servers, and wherein a master media server provides content to a number of slave nodes.

Example 23 includes the subject matter of example 22. In this example, the slave nodes are installed in the master media server.

Example 24 provides a method for rendering content across a number of displays using a media server. The method includes obtaining content for a frame, rendering the content for a number of target display panels, and providing the content to the target display panels.

Example 25 includes the subject matter of example 24. In example 25, rendering the content includes providing the content to an OPS+ pluggable module controlling a target display panel.

Example 26 includes the subject matter of either of examples 24 or 25. In this example, the method includes determining whether a frame crosses a number of display panels, and, if so, dividing the content among the OPS+ pluggable modules controlling the number of display panels.

Example 27 provides a non-transitory, machine readable medium, including instructions that, when executed, direct a processor to detect whether a first connector and a second connector are electrically coupled to a media server, and initialize a video system to provide an enhanced video signal to the media server through the second connector.

Example 28 includes the subject matter of example 27. In this example, the non-transitory, machine readable medium includes instructions that, when executed, direct the processor to detect that only the first connector is electrically coupled to the display panel, and alert a user that an OPS pluggable module has been inserted.

Example 29 includes the subject matter of either of examples 27 or 28. In this example, the non-transitory, machine readable medium includes instructions that, when executed, direct the processor to obtain content for display on a number of display panels.

Example 30 includes the subject matter of any of examples 27 to 29. In this example, the non-transitory, machine readable medium includes instructions that, when executed, direct the processor to provide the content to an OPS+ pluggable module for display on a display panel.

Example 31 includes the subject matter of any of examples 27 to 30. In this example, the non-transitory, machine readable medium includes instructions that, when executed, direct the processor to provide the content to a field-programmable gate array (FPGA) for rendering.

Example 32 includes the subject matter of any of examples 27 to 31. In this example, the non-transitory, machine readable medium includes instructions that, when executed, direct the processor to obtain content based on, at least in part a gender, an identity, a line of sight of a viewer, or a viewing time or any combinations thereof.

Example 33 includes the subject matter of any of examples 27 to 32. In this example, the non-transitory, machine readable medium includes instructions that, when executed, direct the processor to boot into a trusted execute environment.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the techniques. The various appearances of "an embodiment", "one embodiment", or "some embodiments" are not necessarily all referring to the same embodiments. Elements or aspects from an embodiment can be combined with elements or aspects of another embodiment.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

The techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the techniques.

The invention claimed is:

1. An apparatus comprising a media server, the media server comprising:
   a backplane comprising a pair of connectors at each one of a plurality of positions, wherein the pair of connectors is configured to accept a media module, the media module to interface with the pair of connectors at one of the plurality of positions, wherein the media module comprises an OPS+ pluggable module: and
   a plurality of panel video feeds, wherein each one of the plurality of panel video feeds provides a video feed to a video panel from the media module.

2. The apparatus of claim 1, comprising a plurality of media modules, wherein each of the media modules is providing a feed to a display panel.

3. The apparatus of claim 1, the media server comprising a storage manager to interface with internal storage, external storage, or both.

4. The apparatus of claim 1, the media server comprising a processing system to obtain content for a plurality of media modules.

5. The apparatus of claim 1, comprising a media module, wherein media module comprises a multi-use fog device comprising:
   a processor to execute code segments and
   a field-programmable gate array (FPGA) card that is coupled to the processor through a PCIe interface, wherein the FPGA card includes a header for connecting sensors to the multi-use fog device, and wherein the FPGA card comprises an FPGA that provides video processing for the multi-use fog device.

6. The apparatus of claim 5, wherein the multi-use fog device comprises:
   a first video connector to provide a video signal at a first quality; and
   a second video connector to provide a video signal at a second quality, wherein the media server comprises a connection detector that determines the quality of the video signal to provide based, at least in part, on whether only the first video connector is electrically connected or if both the first video connector and the second video connector are electrically connected.

7. The apparatus of claim 1, wherein the media server comprises an input interface to couple to input sensors.

8. The apparatus of claim 1, comprising a school environment comprising a video infrastructure, wherein the media server provides content to intelligent whiteboards located in classrooms.

9. The apparatus of claim 8, wherein the media server transcodes content for the intelligent whiteboards.

10. The apparatus of claim 1, comprising a video wall comprising a media server providing content to a plurality of media modules.

11. The apparatus of claim 10, wherein each media module provides video for a display panel in the video wall.

12. The apparatus of claim 1, comprising a multi-kiosk implementation comprising a video infrastructure, wherein the media server provides content to a plurality of master media servers, and wherein a master media server provides content to a plurality of slave nodes.

13. A method for rendering content across a number of displays using a media server, comprising:
   obtaining content for a frame;
   rendering the content for a plurality of target display panels, wherein rendering the content comprises providing the content, to an OPS+ pluggable module controlling a target, display panel; and
   providing the content to the plurality of target display panels.

14. The method of claim 13, comprising determining whether a frame crosses a plurality of display panels, and, if so, dividing the content among OPS+ pluggable modules controlling the plurality of display panels.

15. A non-transitory, machine readable medium, comprising instructions that, when executed, direct a processor to:
   detect whether a first connector and a second connector are electrically coupled to a media server, wherein the first and second connectors are disposed on an OPS+ pluggable module; and
   initialize a video system to provide an enhanced video signal to the media server through the second connector.

16. The non-transitory, machine readable medium of claim 15, comprising instructions that, when executed, direct the processor to:
   detect that only the first connector is electrically coupled to a display panel; and
   alert a user that the OPS+ pluggable module has been inserted.

17. The non--transitory, machine readable medium of claim 15, comprising instructions that, when executed, direct the processor to obtain content for display on a plurality of display panels.

18. The non-transitory, machine readable medium of claim 17, comprising instructions that, when executed, direct the processor to provide the content to the OPS+ pluggable module for display on a display panel.

19. The non-transitory, machine readable medium of claim 18, comprising instructions that, when executed, direct the processor to provide the content to a field-programmable gate array (FPGA) for rendering.

20. The non-transitory, machine readable medium of claim 15, comprising instructions that, when executed, direct the processor to obtain content based on, at least in part a gender, an identity, a line of sight of a viewer, or a viewing time or any combinations thereof.

21. The non-transitory, machine readable medium of claim 15, comprising instructions that, when executed, direct the processor to hoot into a trusted execute environment.

22. The non-transitory, machine readable medium of claim 15, comprising instructions that, when executed, direct the processor to provide an interface to a viewer.

* * * * *

UNITED STATES PATENT AND TRADEMARK OFFICE
CERTIFICATE OF CORRECTION

PATENT NO. : 11,178,432 B2  
APPLICATION NO. : 16/347758  
DATED : November 16, 2021  
INVENTOR(S) : Ilhan et al.

Page 1 of 1

It is certified that error appears in the above-identified patent and that said Letters Patent is hereby corrected as shown below:

In the Claims

Column 19, Line 25, Claim 1, delete "module:" and insert --module;-- therefor

Column 19, Line 39, Claim 5, after "wherein", insert --the--

Column 19, Line 41, Claim 5, delete "segments" and insert --segments;-- therefor Column 20, Line 17, Claim 13, delete "content," and insert --content-- therefor Column 20, Line 61, Claim 21, delete "hoot" and insert --boot-- therefor Signed and Sealed this  
Eleventh Day of January, 2022

Drew Hirshfeld  
*Performing the Functions and Duties of the  
Under Secretary of Commerce for Intellectual Property and  
Director of the United States Patent and Trademark Office*